Dec. 21, 1965 A. P. JONES ETAL 3,224,702
WEB WINDING APPARATUS
Filed Dec. 19, 1962
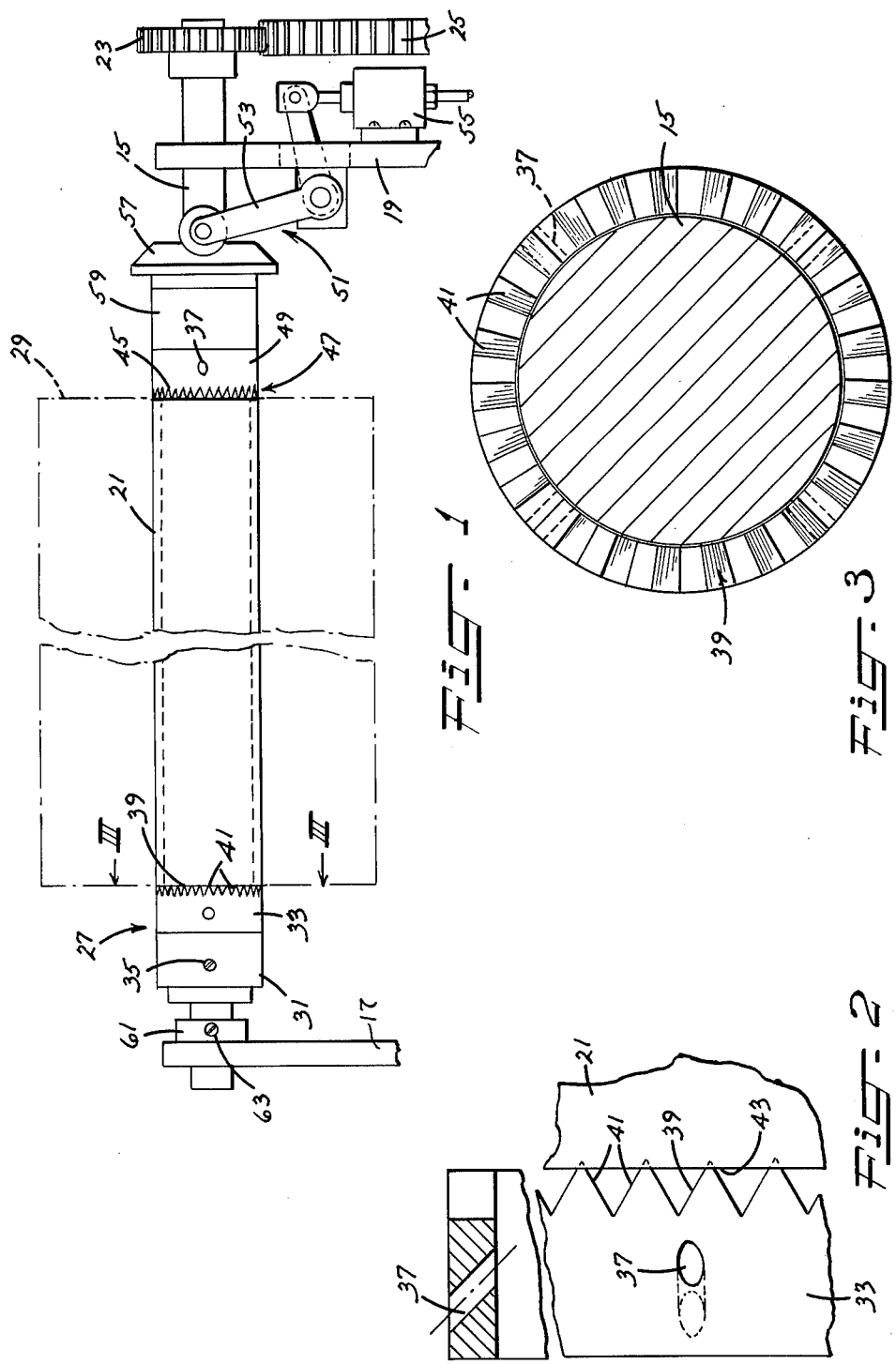

United States Patent Office 3,224,702
Patented Dec. 21, 1965

3,224,702
WEB WINDING APPARATUS
Allen P. Jones and Wade W. Jett, Fredericksburg, and Joseph A. Zitz, Stafford, Va., assignors, by mesne assignments, to FMC Corporation, San Jose, Calif., a corporation of Delaware
Filed Dec. 19, 1962, Ser. No. 245,871
4 Claims. (Cl. 242—68.4)

The invention relates to improvements in winding apparatus and is particularly useful in sheet material or web slitting and rewinding machines.

In conventional slitting and rewinding apparatus, a continuous and relatively wide web is passed around a constant speed roll against which one or more cutters operate to sever the web into desired narrower rewind widths. These cut widths or strips pass to and are collected upon rewind rolls or cores which are rotatably mounted on one or more positively driven rewind shafts.

Generally, a friction drive is employed for transmitting a rotary movement to a rewind core from the rewind shaft on which it is mounted. Such friction drive includes a pair of friction rings, one of which is fixed to the rewind shaft and serves to rotate the other of such rings and the rewind core as the rewind shaft is turned. This driving arrangement permits the speed of rotation of the rewind core to vary during the winding operation, while the rotary speed of the positively driven rewind shaft remains substantially constant.

Desirably, when a rewind core and shaft are rotating at different speeds, slippage should be confined to only the rings of the friction drive. It has been found, however, that considerable slippage occurs between the rewind core and the adajacent friction ring, even when such ring is equipped with pins which project into the core end wall, and that such slippage is especially pronounced when rewinding wide widths and/or large diameter rolls. Slippage between the end wall of a core and the adjacent friction ring develops excessive heat which may damage some of the properties of the web being wound, and may even cause layers of a heat-sealable web to be bonded together. When slippage occurs between a rewind core and a friction ring having projecting pins, rubbing or chafing of the core creates a fine dust which collects in-between the layers of the web as it is rolled upon itself. Further, the pins on the friction ring are often bent or sheared and thus require continuous maintenance. Accordingly, a primary object of this invention is to provide an improved and more satisfactory web winding apparatus.

Another object is to provide an improved friction drive for a web winding apparatus which includes a friction ring having a serrated end wall which is adapted to grip with an end wall of a rewind core and rotate the same with a minimum or no slippage.

Still further objects will appear from the following description.

The above objects are achieved in accordance with the present invention by a web winding apparatus having an improved friction drive which prevents or minimizes slippage between a rewind core and an adjacent driving means. More specifically, the friction drive of the present invention includes a friction ring which is rotatably mounted on a rewind shaft and is formed with a serrated end wall; that is, an end wall which is formed of a series of teeth which extend approximately across the thickness of the core and are adapted to penetrate or bite into an adjacent end wall of such core. A second friction ring is fixed to the rewind shaft and serves to rotate the serrated friction ring, and the rewind core with which it is engaged, when the rewind shaft is turned. With this arrangement, differences in the speed of rotation of the rewind shaft and core are accompanied by slippage between the drive friction rings, rather than between the friction drive and rewind core, so that damage to the apparatus and/or the web being collected is thereby avoided.

In the drawing, FIGURE 1 is a front view of the winding apparatus of the present invention;

FIGURE 2 is an enlarged fragmentary view of a portion of the apparatus shown in FIGURE 1; and FIGURE 3 is an end view of an element of the apparatus as shown along the lines of III—III of FIGURE 1.

With reference to the drawing, the rewinding apparatus of the present invention includes a shaft 15 which is rotatably mounted between fixed supports 17 and 19 and which rotatably carries a rewind or take-up core 21. A conventional motor, not shown, positively drives the shaft 15 through gears 23 and 25, with the shaft 15 in turn rotating the take-up core 21 through a friction drive 27. As in known winding apparatus, the friction drive 27 permits the rotary speed of the core 21 to decrease with the build up of the web, as indicated in broken lines at 29, while the speed of rotation of the positively driven shaft 15 remains substantially unchanged.

The friction drive 27 includes a pair of friction rings 31 and 33 which are together mounted on the shaft 15, but with only the ring 31 being fixed in place, as by a set screw 35. The friction ring 33 is provided with a series of spaced cooling vents or openings 37, for reasons as hereafter described, and has a serrated end wall 39. As best shown in FIGURES 2 and 3, the serrations along the end wall 39 are a continuous series of evenly spaced, pointed teeth 41 which extend substantially radially of the friction ring 33. These teeth 41 extend approximately across the thickness of the rewind core 21 and are designed to penetrate or bite into an adjacent end wall 43 of such core 21.

Preferably, the opposite end wall 45 of the core 21 is engaged by a serrated end wall 47 of a friction ring 49, which is also freely rotatable on the shaft 15 and is generally the same as the friction ring 33 in both function and construction. The core 21 is snugly clamped between the friction rings 33 and 49 by a conventional end loading means 51, which includes a load applying crank 53, a crank actuating valve 55, and a conical pressure ring 57 against which the crank reacts. A rotatable spacer ring 59 is interposed between the friction ring 49 and the presure ring 57 for transmitting the applied load to the core 21, and a collar 61 is fixed by screw 63 to the shaft 15 and bears against the fixed support 17 so as to prevent longitudinal movement of the shaft 15 under the influence of the end loading means 51.

The above-described apparatus is prepared for use in the conventional manner, with one or more rewind cores 21 and the various necessary rings being assembled on the shaft 15 before it is positioned within the apparatus. The upper ends of the supports 17 and 19 are each formed with a U-shaped slot which together serve as bearings and permit the assembled shaft to be lifted onto and from the supports by any suitable means, not shown. The gear 23 is fixed to the shaft 15 and thus meshes with the gear 25 when the shaft 15 is first positioned on the fixed supports. The collar 61 is then fixed in place against the support 17 after which the end loading means 51 is actuated to firmly lock the core 21 in-between the serrated end walls of the rings 33 and 49.

The arrangement shown in FIGURE 1 of the drawing may be employed, for example, for rewinding a cellophane web after its normally defective edge portions have been cut away and carried to a scrap collector.

During the initial stages of the winding operation, the core 21 and shaft 15 will rotate at substantially the same rate of speed so that little or no slippage will occur between the rings 31 and 33 of the friction drive 27. As the web gradually builds up on the core 21, as shown at 29, the speed of rotation of the core 21 decreases while that of the shaft 15 remains substantially constant. The biting engagement of the core 21 by the teeth of the serrated end wall of the ring 33, and also of the ring 49, prevents relative movement between these parts. Thus, to compensate for the difference in the rotary speed of the shaft 15 and core 21, slippage will occur between and will, in general, be confined to the rings 31 and 33 of the friciton drive 27.

It will be noted that problems encountered with conventional winding machines, such as damage to the core, friction ring, and/or the creation of dust particles, are eliminated by the apparatus of the present invention. While heat is developed when slippage occurs between the rings 31 and 33 of the friction drive 27, the source of such heat is well removed from the core 21 so that damage to the web being wound is prevented. As a further precaution, the rings 33 and 49 are each provided with at least one air vent 37 which assists in removing heat developed during slippage of the friction rings. It will be noted that the vents 37 extend at acute angles to both the serrated end wall and the axis of the respective rings 33 and 49 so that the heat being removed is directed away from the web which is being wound.

While the friction rings 33 and 49 are each illustrated as being formed from a single piece of material, for the sake of strength, the teeth 41 forming a serrated end wall may be machined into an annular steel member which is fixed to a second annular member formed of a thermosetting resin and other suitable material which can withstand the heat and frictional effects encountered during use. Additionally, the size or number of teeth 41 employed in forming the serrated end walls of the friction rings may be varied to suit particular operating conditions, with generally narrow, and thus more pointed teeth being most satisfactory with conventional cores constructed of hard materials.

It is to be understood that changes and variations may be made without departing from the spirit and scope of the invention as defined in the appended claims.

We claim:
1. Web winding apparatus including a shaft, means for positively rotating said shaft, a core on which a web is to be wound mounted on said shaft for free rotation thereon, a ring mounted for free rotation on said shaft, said ring having a serrated end wall formed of a series of teeth which snugly engage with an adjacent wall of said core and extend approximately across the thickness thereof, a second ring fixed to said shaft and adapted to frictionally engage with and rotate said first-mentioned ring when said shaft is driven, and means for maintaining said core in snug engagement with the serrated end wall of said first-mentioned ring.

2. Web winding apparatus including a shaft, means for positively rotating said shaft, a core on which a web is to be wound mounted on said shaft for free rotation thereon, a friction drive for rotating said core when said shaft is driven, said friction drive including a pair of cooperatng friction rings mounted on said shaft, one of said friction rings being fixed to said shaft and frictionally engaged with the other of said rings, the other of said rings having a continuous series of spaced teeth extending radially along one end wall thereof, said teeth extending approximately across the thickness of said core and adapted to penetrate therein, and means for urging said core longitudinally of said shaft and into snug engagement with the teeth of said one end wall of said other friction ring.

3. Apparatus as defined in claim 2 wherein the radially extending teeth of said other friction ring are pointed and are equally spaced along the surface thereof.

4. Apparatus as defined in claim 2 wherein said other friction ring is provided with at least one through opening for removing heat developed during slippage of the friction rings, said opening having an axis extending at an acute angle to both the friction ring axis and said one end wall thereof so as to direct heat away from the core.

References Cited by the Examiner

UNITED STATES PATENTS

| | | | |
|---|---|---|---|
| 223,894 | 1/1880 | Dickens | 242—68 |
| 830,239 | 9/1906 | Lingenfelter | 242—68.4 |
| 1,437,398 | 12/1922 | Cameron et al. | 242—68.5 |
| 1,506,891 | 9/1924 | Duncan | 242—67.1 X |
| 1,685,172 | 5/1926 | Saunders. | |
| 2,292,929 | 8/1942 | Crebbs | 242—46.2 X |
| 2,526,029 | 10/1950 | Judelson | 242—75 X |
| 2,533,307 | 12/1950 | Amos et al. | 242—75.5 |

MERVIN STEIN, *Primary Examiner.*

RUSSELL C. MADER, *Examiner.*